(12) United States Patent
Pavkovich

(10) Patent No.: US 8,660,335 B2
(45) Date of Patent: Feb. 25, 2014

(54) TRANSIENT PIXEL DEFECT DETECTION AND CORRECTION

(75) Inventor: John Pavkovich, Palo Alto, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 981 days.

(21) Appl. No.: 12/731,062

(22) Filed: Mar. 24, 2010

(65) Prior Publication Data

US 2011/0235940 A1  Sep. 29, 2011

(51) Int. Cl.
*G06K 9/00* (2006.01)
*G06K 9/34* (2006.01)
*H04N 5/217* (2011.01)

(52) U.S. Cl.
USPC .............. 382/149; 382/275; 348/241

(58) Field of Classification Search
None
See application file for complete search history.

(56) References Cited

U.S. PATENT DOCUMENTS

| | | | | |
|---|---|---|---|---|
| 4,824,660 A * | 4/1989 | Angello et al. | ............... | 424/1.61 |
| 5,127,064 A * | 6/1992 | Flinois et al. | ............... | 382/149 |
| 5,327,246 A * | 7/1994 | Suzuki | ............... | 348/246 |
| 5,970,115 A * | 10/1999 | Colbeth et al. | ............... | 378/62 |
| 6,243,498 B1 * | 6/2001 | Chen et al. | ............... | 382/260 |
| 6,424,750 B1 * | 7/2002 | Colbeth et al. | ............... | 382/260 |
| 6,526,366 B1 | 2/2003 | Dunton | | |
| 6,529,622 B1 * | 3/2003 | Pourjavid | ............... | 382/149 |
| 6,683,643 B1 * | 1/2004 | Takayama et al. | ............... | 348/247 |
| 6,744,912 B2 * | 6/2004 | Colbeth et al. | ............... | 382/132 |
| 6,970,194 B1 * | 11/2005 | Smith | ............... | 348/247 |
| 7,009,644 B1 * | 3/2006 | Sanchez et al. | ............... | 348/247 |
| 7,129,975 B2 * | 10/2006 | Levine et al. | ............... | 348/246 |
| 7,283,165 B2 * | 10/2007 | Alderson et al. | ............... | 348/246 |
| 7,362,916 B2 * | 4/2008 | Yamazaki | ............... | 382/275 |
| 7,388,609 B2 * | 6/2008 | Pinto et al. | ............... | 348/246 |
| 7,405,756 B2 * | 7/2008 | Itoh | ............... | 348/246 |
| 8,023,012 B2 * | 9/2011 | Irie | ............... | 348/247 |
| 8,259,198 B2 * | 9/2012 | Cote et al. | ............... | 348/246 |
| 8,294,781 B2 * | 10/2012 | Cote et al. | ............... | 348/222.1 |
| 8,325,253 B2 * | 12/2012 | Sumiya | ............... | 348/246 |
| 8,379,118 B2 * | 2/2013 | Komori | ............... | 348/241 |
| 8,472,712 B2 * | 6/2013 | Cote et al. | ............... | 382/167 |
| 2002/0149683 A1 * | 10/2002 | Post | ............... | 348/246 |
| 2002/0191828 A1 * | 12/2002 | Colbeth et al. | ............... | 382/132 |
| 2003/0128337 A1 * | 7/2003 | Jaynes et al. | ............... | 353/30 |
| 2004/0169746 A1 * | 9/2004 | Chen et al. | ............... | 348/246 |
| 2008/0298717 A1 | 12/2008 | Lee | | |

FOREIGN PATENT DOCUMENTS

WO   2007055494 A1   5/2007

OTHER PUBLICATIONS

PCT, International Search Report and Written Opinion in PCT/US2011/029179, Dec. 21, 2011, 6 pages.

* cited by examiner

*Primary Examiner* — Manav Seth
(74) *Attorney, Agent, or Firm* — Houst Consulting

(57) ABSTRACT

A method of processing images produced by an imaging system includes detecting transient defects by comparing the value of a selected pixel with values of a plurality of the neighboring pixels, excluding known defective pixels. The value of the selected pixel may be compared with the maximal or minimal value of the neighboring pixels, and if the comparison shows that the value of the selected pixel exceeds the maximal or minimal value by a predetermined value, then the pixel may be identified as producing transient defect. Alternatively, the value of the selected pixel may be compared with the median value of the neighboring pixels, and if the comparison shows that the value of the selected pixel deviates the median value by a predetermined value, then the pixel may be identified as producing transient defect.

17 Claims, 3 Drawing Sheets

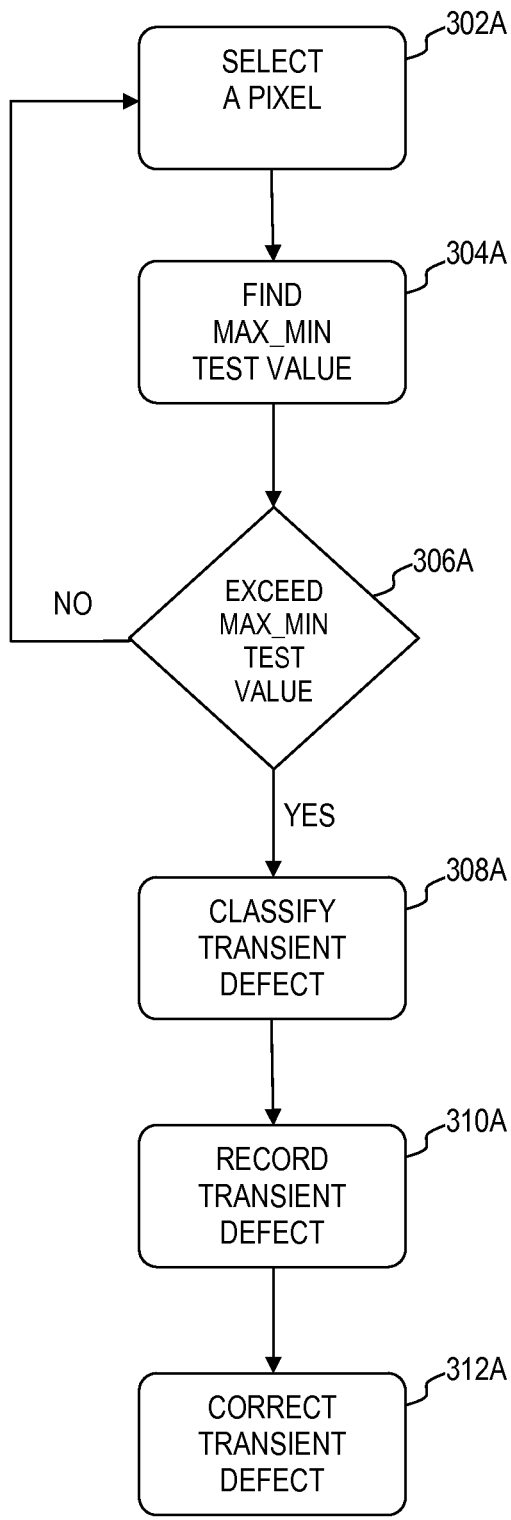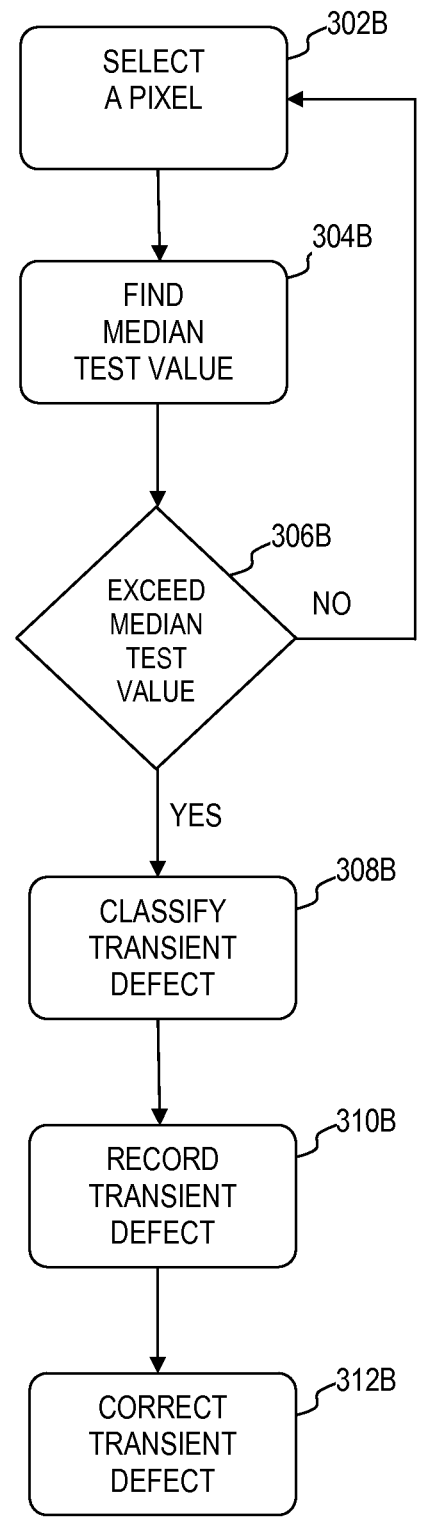
FIG. 3A
FIG. 3B

TRANSIENT PIXEL DEFECT DETECTION AND CORRECTION

BACKGROUND

This invention relates generally to imaging systems and methods. More particular, this invention relates to methods of detecting and correcting transient pixel defects in digital images produced by an imaging system.

Various imaging systems including X-ray radiography, single photon emission computed tomography (SPECT), positron emission tomography (PET), magnetic resonance imaging (MRI), and ultrasound imaging etc. are known and used in acquisition of images. In each imaging system, some kind of detector is used to detect electromagnetic radiation passed through a body of interest. For instance, an X-ray image acquisition system may employ a solid state detector having a detector array including a large number of detector elements or pixels. The detector elements produce image data signals which can be collected, stored, processed, and displayed as digital images. The images acquired may provide detailed information on the structures inside the body of interest, which is useful e.g. in medical diagnosis, security inspection, and other applications.

It is known that a detector array may include defective pixels formed in the course of manufacturing or use of the detector. Defective pixels either do not respond electrically under operation conditions or respond significantly differently from surrounding pixels. Accordingly, a detector may lose information or produce incorrect information in images at locations which contain defective pixels. Defective pixels in a detector are typically identified in a defect map created when the detector is tested or calibrated. In use image data acquired by the detector is compensated or corrected using the defect map and some kind of algorithms known in the art.

There are instances where a pixel of a detector behaves properly almost all of the time but on very rare occasions produces a value that deviates from its proper value. Such defect is referred to as transient defect. Transient defect may occur at any pixel in a detector although it rarely occurs. A pixel of a detector producing transient defect is not necessarily a defective pixel or a property of that detector element. While the causes of forming transient defects are unknown, detection and correction of transient defects is important to ensure accurate production of images useful for medical diagnosis or other applications.

SUMMARY

The present invention provides a method of detecting and correcting transient defects in images produced by an imaging system. In the method the value of a selected pixel is compared with the values of a plurality of neighboring pixels, excluding known defective pixels.

In some embodiments, the maximal or minimal value of neighboring pixels, excluding known defective pixels, can be determined, and the value of the selected pixel is compared with the maximal or minimal value. The selected pixel can be identified or recorded as producing a transient defect if the value of the selected pixel is equal to or greater than a predetermined value above the maximal value or equal to or smaller than a predetermined value below the minimal value.

In some embodiments, the median value of the neighboring pixels, excluding known defective pixels, can be determined and the value of a selected pixel is compared with the median value. The selected pixel can be identified as producing a transient defect if the value of the selected pixel deviates from the median value by a predetermined value.

The transient defect produced by the pixel identified can be corrected using values of the neighboring pixels excluding known defective pixels. In some embodiments, the value of the pixel producing transient defect can be replaced by an average value of two or more good neighboring pixels.

In another aspect a method of processing images includes receiving an image data set acquired by a detector assembly. The detector assembly may include a detector array having a plurality of pixels with one or more pixels being defective. Transient defects in the image data set are first detected and corrected if present. Then the values of defective pixels are corrected.

In some embodiments, information about the transient defects are recorded or reviewed. A pixel may be identified as a defective pixel if transient defects occur at the pixel with some frequency.

BRIEF DESCRIPTION OF THE DRAWINGS

These and various other features and advantages will become better understood upon reading of the following detailed description in conjunction with the accompanying drawings and the appended claims provided below, where:

FIGS. 3A and 3B are flow charts illustrating an exemplary method of detection and correction of transient defects in accordance with some embodiments of the invention.

DETAILED DESCRIPTION OF EMBODIMENTS

Various embodiments of radiation apparatuses and methods are described. It is to be understood that the invention is not limited to the particular embodiments described as such may, of course, vary. An aspect described in conjunction with a particular embodiment is not necessarily limited to that embodiment and can be practiced in any other embodiments. For instance, while various embodiments are described in connection with an X-ray imaging system, it will be appreciated that the invention can also be practiced in other imaging modalities. It is also to be understood that the terminology used herein is for the purpose of describing particular embodiments only, and is not intended to be limiting since the scope of the invention will be limited only by the appended claims, along with the full scope of equivalents to which such claims are entitled.

Figure 1:
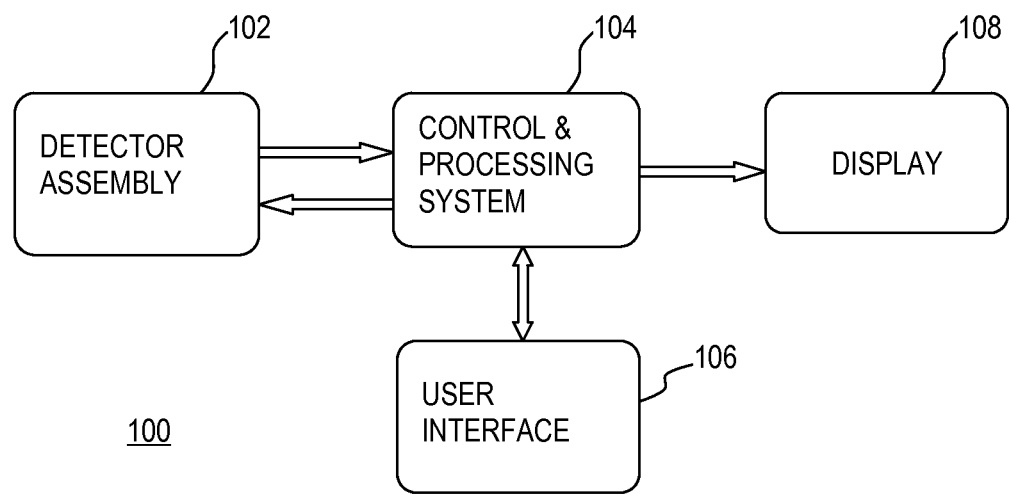
FIG. 1 is a schematic diagram illustrating an exemplary imaging system in accordance with some embodiments of the invention.

FIG. 1 illustrates an exemplary imaging system 100 that can embody the principle of the invention. The imaging system 100 may include a detector assembly 102, a control and processing system 104, a user interface 106, and a display 108. By way of a user interface 106 such as a graphical user interface, keyboard, mouse, etc., the control and processing system 104 may generate control signals for the detector assembly 102, which provides image data signals in return. The control and processing system 104 may process the image data signals, including correcting pixel defects in the image data acquired, and provide processed images for display on the display 108.

Figure 2:
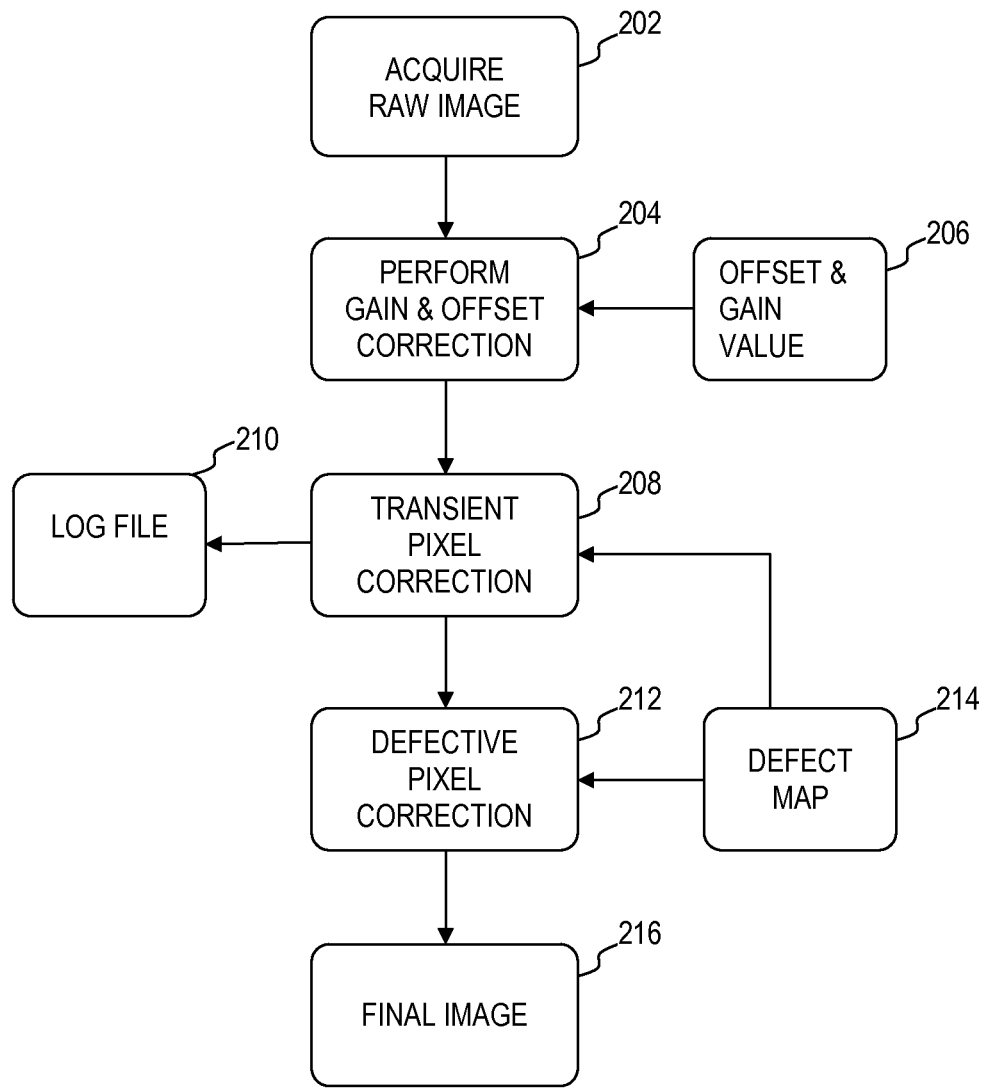
FIG. 2 is a flow chart illustrating an exemplary method of processing images produced by an imaging system in accordance with some embodiments of the invention.

FIG. 2 illustrates an exemplary method of processing images produced by an imaging system according to some embodiments of the invention. In general, the method includes detection and correction of transient pixel defects in an image by examining values of pixels surrounding or adjacent to a pixel and determining if the value of the pixel in question exceeds the maximal or minimal or median value of the surrounding or adjacent good pixels by some criteria. If the value of the pixel exceeds those values by the specified criteria, it is identified as a transient defect and corrected before known defective pixels are corrected. As used herein, the term "defective pixels" refer to those in a detector that do not respond under operation conditions or respond significantly differently from surrounding good pixels. Signals produced by a defective pixel exceed the limits on its offset value, or the gain associated with it is too high or too low. A defect map which defines the location of every known defective pixel of a detector is usually created when the detector is tested or calibrated. The term "transient pixel defects" or "transient defects" in an image refer to those that are caused by pixels that behave properly almost all of the time but on very rare occasions produce values that deviate from their proper values. Transient defects may occur at any pixel in a detector although it rarely occurs. A pixel that produces a transient defect is not necessarily a defective pixel or a property of that pixel. If a pixel produces transient defects in images with a certain frequency, it can and should be classified as a defective pixel. In general, very few transient defects or none are expected to be detected in any image. However, it is important to detect and correct transient defects as they are disruptive, negatively affect visual inspection of images and correction of known defective pixels.

Referring to FIG. 2, an exemplary method of processing images includes the following steps. A raw image data set is acquired (step 202) by a detector assembly. A sampled, digitized image data set is gain and offset corrected (step 204) using gain and offset values stored in a memory 206. Then the image data is filtered for detection and correction of transient pixel defects (step 208) on a pixel-by-pixel basis. The information about transient pixel defects may be recorded in a log file 210. After detection and correction of transient pixel defects, known defective pixels can be corrected (step 212) using a defect map stored in a memory 214. The final corrected images can be displayed (step 216) on a display.

The raw image data may be acquired (step 202) by any suitable detector assembly 102. By way of example, the raw image data may be an X-ray image data set acquired by a solid state X-ray detector which may include a radiation conversion layer and a detector array. The radiation conversion layer may include scintillators configured to generate light photons in response to X-ray radiation, or may include photoconductors configured to generate electron-hole pairs or charges in response to X-ray radiation. The detector array may include a plurality of detector elements or pixels configured to generate electrical signals in response to the light photons or electron-hole charges from the radiation conversion layer. Various other detection schemes are possible and can be used in embodying the principle of the invention.

The detector array may include a large number e.g. millions of detector elements or pixels arranged in rows and columns or other patterns forming an active detection area. By way of example, in some embodiments each pixel in a detector array may include a switching transistor and a photodiode. The anode of the photodiode may be biased by a biasing voltage to establish a capacitance for storing electrical charges which accumulate due to the reception of incident light or electron-hole pairs from the conversion layer. When a pixel is accessed, an address signal from an array driver circuit drives the gate of the switching transistor (TFT), thereby providing a data signal representing the stored charge from the photodiode. This signal is received and buffered by a charge sensitive amplifier within a receiver circuit assembly. In some embodiments, in acquisition of image data each row address signal from an array driver circuit can be asserted for a predetermined period of time or "line time." During assertion of each row address signal, the signal from each pixel along that row is transmitted via column data lines to a receiver circuit assembly where the signal on each data line is received and buffered by a corresponding charge sensitive amplifier. Hence, an entire row of image data is captured in one line time period. With each subsequent line time period, a subsequent row of image data is captured. At the end of a "frame time" period, the entire image has been captured. In this manner, each pixel contained in the entire active detection area can be sampled individually. The image data signals can be converted by analog-to digital converters (ADCs), and the resulting digitized image data signals can be then multiplexed, buffered, and transmitted to a control and processing system 104 for further processing.

Gain and offset correction (step 204) may be performed on the digitized image data to correct for variations in pixel dark current and pixel sensitivity of the detector array. It is known that in the absence of X-rays, each pixel or detector element may have certain amount of leakage or dark current associated with it. Finite gray scale value result from image acquisition in the absence of X-rays, depending on the dark current value in each individual detector element. The dark current values are different from pixel to pixel, and from exposure to exposure. Offset correction corrects for the variation in dark current on a pixel-by-pixel basis. On exposure of X-rays, each pixel or detector element may have a subtly different response due to non-uniformities in gain profiles of the amplifiers or in exposure profile etc. Gain correction corrects for the difference in gain between detector elements. The gain and offset values used for gain and offset correction can be collected by any suitable technique known in the art. For example, an offset value can be obtained by acquiring a series of dark images in the absence of X-rays exposure and averaging together. A gain value can be obtained by acquiring a series of gain images using homogeneous X-ray exposure and averaging together. The control and processing system 104 may include a memory for storing gain and offset values 206 and a correction stage for performing gain and offset correction. In general an offset and gain correction involves subtraction of an offset value from original uncorrected pixel and multiplying the result by a gain correction factor.

In accordance with some embodiments of the invention, the gain and offset corrected image data can be processed for detection and correction of transient pixel defects (step 208). It appears that when a transient pixel defect occurs, the pixel deviates from its correct value by a quite significant amount. Therefore, according to some embodiments, transient pixel defects can be detected by comparing the value of each pixel with the values of pixels surrounding or adjacent the pixel in question. For example, the value of each selected pixel may be compared with the values of eight neighboring pixels in a 3×3 array or with values of different number of neighboring pixels in an array of different size. In performing the comparison, if any of the surrounding or adjacent pixels is known to be defective such as identified in a defect map, its value is excluded in the comparison.

FIGS. 3A and 3B illustrate exemplary methods for detecting and correcting transient defects in an image on a pixel-by-pixel basis. In some embodiments as shown in FIG. 3A, a pixel is selected for detection of transient defect (step 302A), and the maximal and minimal values of the pixels surrounding or adjacent the selected pixel are determined (step 304A), excluding values of any known defective pixels. A test is then performed to determine if the value of the selected pixel is above the maximal or below the minimal value by more than some specified amount (MAX_MIN TEST VALUE) (step 306A). A pixel is identified as producing transient defect if the test shows that the value of the selected pixel is above the maximal value or below the minimal value by more than the specified amount (step 308A), in which case the information about the transient pixel defect is recorded (step 310A) and the transient defect corrected (step 312A) as described in greater detail below. If the selected pixel passes the MAX_MIN test then the process proceeds to select a next pixel and repeat the above steps. The MAX_MIN TEST VALUE can be a fixed value or can be calculated from an overall image or from a subregion of the image. The specific value can be chosen by experiment.

In alternative embodiments illustrated in FIG. 3B, a pixel is selected for detection of transient defects (step 302B), and the median value of the pixels surrounding or adjacent the selected pixel is calculated (step 304B), excluding values of any known defective pixels. A test is then performed to determine if the value of the selected pixel deviates from the median value by more than some specified amount (MEDIAN TEST VALUE) (step 306B). A pixel is identified as producing a transient defect if its value deviates from the median value by more than the specified amount (step 308B), in which case the information about the transient pixel defect is recorded (step 310B), and the transient defect corrected (step 312B) as described in greater detail below. If the selected pixel passes the MEDIAN test then the process proceeds to select a next pixel and repeat the above steps. The MEDIAN TEST VALUE can be a fixed value or can be calculated from an overall image or from a subregion of the image. The specific value can be chosen by experiment.

The information about transient pixel defects recorded in a log file can be reviewed, and if any pixel is detected to produce transient defects with some frequency, then that pixel can and should be classified as a defective pixel and so identified in a defect map.

The transient defect detected in an image can be corrected by interpolation using surrounding good pixels. By way of example, the value of a pixel producing a transient defect can be replaced by an average value of two or more good neighboring pixels. For example, if a pixel is detected as producing a transient defect, the values of its eight neighboring pixels in a 3×3 array including N, S, W, E, NW, NE, SW, and SE pixels can be used in correcting the transient defect. The corrected value can be an average value of two neighboring pixels such as N and S, E and W, NW and SE, or NE and SW pixels, or an average value of four neighboring pixels such as N, S, W, and E pixels, or NW, NE, SW, and SE pixels. The corrected value can also be an average value of eight neighboring pixels including N, S, W, E, NW, NE, SW, and SE pixels. Various other interpolation schemes are possible and can be used. In correction of transient defects, the values of known defective pixels are excluded.

For performing detection and correction of transient defects, the control and processing system 104 may include a stage for transient defect detection and correction, and a memory for recording information about transient defects. For example, the control and processing system 104 may include a sorting unit for comparing the values of neighboring pixels with each other and providing an output in a predetermined order such as from the maximal value to the minimal value or vice versa. The control and process system 104 may also include an averaging unit for summing the values of neighboring pixels and providing an output with an average value. A comparison unit may also be included for comparing the value of a selected pixel with the maximal, minimal, or median value of its neighboring pixels by some criteria. Circuitries for these and other conventional units are known in the art and their description is omitted to simplify the description of the invention.

Returning to FIG. 2, after correction of transient defects (step 208), the values of known defective pixels can be corrected (step 212). As described above, a detector such as a solid state X-ray detector may include a large number e.g. millions of pixels or detector elements. Due to imperfection of the manufacturing processes or in the course of use of the detector, some portion of the detector elements may be or become defective. Defective pixels either do not respond under operation conditions or respond significantly differently from surrounding good pixels. Methods have been developed in the industry to detect defective pixels and a defect map is usually created when a detector is tested and calibrated to identify the locations of each defective pixel. Methods for correcting known defective pixels are also known in the industry including interpolation using surrounding good pixels. In accordance with embodiments of the invention, correction of known defective pixels may be performed after detection and correction of transient defects. Transient defects should be corrected before known defective pixels correction since correcting a known defective pixel may use the value of a pixel that produces transient defect. The final corrected images may be stored in the control and processing system or provided for display on a display (step 216).

A method of processing images including detecting and correcting transient pixel defects in images produced by an imaging system has been described. Those skilled in the art will appreciate that various other modifications may be made within the spirit and scope of the invention. All these or other variations and modifications are contemplated by the inventors and within the scope of the invention.

What is claimed is:

1. A method of processing images produced by an imaging system comprising the step of detecting transient defects in an image, said detecting step comprising comparing a value of a selected pixel with values of a plurality of neighboring pixels excluding known defective pixels.

2. The method of claim 1 wherein said comparing step comprising determining a maximal or minimal value of the neighboring pixels excluding known defective pixels, and comparing the value of the selected pixel with the maximal or minimal value.

3. The method of claim 2 further comprising the steps of identifying the selected pixel as producing transient defect if the value of the selected pixel is equal to or greater than a predetermined value above the maximal value or equal to or smaller than a predetermined value below the minimal value.

4. The method of claim 3 further comprising the step of correcting the value of the identified pixel using values of the neighboring pixels excluding known defective pixels.

5. The method of claim 2 wherein the maximal or minimal value of the neighboring pixels is determined based on a 3×3 array excluding known defective pixel or pixels.

6. The method of claim 1 wherein said comparing step comprising determining a median value of the neighboring pixels excluding known defective pixels, and comparing the value of the selected pixel with the median value.

7. The method of claim 6 further comprising identifying the selected pixel as producing transient defect if the value of the selected pixel deviates from the median value by a predetermined value.

8. The method of claim 7 further comprising the step of correcting the value of the identified pixel by using values of neighboring pixels excluding known defective pixels.

9. The method of claim 7 wherein the median value of neighboring pixels is determined based on a 3×3 array excluding known defective pixel or pixels.

10. A method of processing images produced by an imaging system comprising the steps of:
  receiving an image data set acquired by a detector assembly, said detector assembly comprising a detector array including a plurality of pixels with one or more pixels being defective;
  detecting transient defects in the image data set;
  correcting the detected transient defects;
  correcting values of the defective pixels;
  recording the transient defects detected; and
  identifying a pixel as a defective pixel if the pixel produces transient defects with some frequency.

11. A method of processing images produced by an imaging system comprising the steps of:
  receiving an image data set acquired by a detector assembly, said detector assembly comprising a detector array including a plurality of pixels with one or more pixels being defective;
  detecting transient defects in the image data set;
  correcting the detected transient defects; and
  correcting values of the defective pixels;
  wherein the step of detecting transient defects comprising comparing a value of a selected pixel with values of a plurality of neighboring pixels excluding known defective pixels.

12. The method of claim 11 wherein said comparing step comprising determining a maximal or minimal value of neighboring pixels excluding known defective pixels, and comparing the value of the selected pixel with the maximal or minimal value.

13. The method of claim 12 further comprising the steps of identifying the selected pixel as causing transient defect if the value of the selected pixel is equal to or greater than a predetermined value above the maximal value or equal to or smaller than a predetermined value below the minimal value.

14. The method of claim 13 further comprising the step of correcting the value of the identified pixel using values of the neighboring pixels excluding known defective pixels.

15. The method of claim 12 wherein said comparing step comprising determining a median value of the neighboring pixels excluding known defective pixels, and comparing the value of the selected pixel with the median value.

16. The method of claim 15 further comprising identifying the selected pixel as producing transient defect if the value of the selected pixel deviates from the median value by a predetermined value.

17. The method of claim 16 further comprising the step of correcting the value of the identified pixel by using values of the neighboring pixels excluding known defective pixels.

* * * * *